Nov. 27, 1951
M. D. WALKLET
2,576,270
WHEEL CONSTRUCTION
Filed Oct. 25, 1947
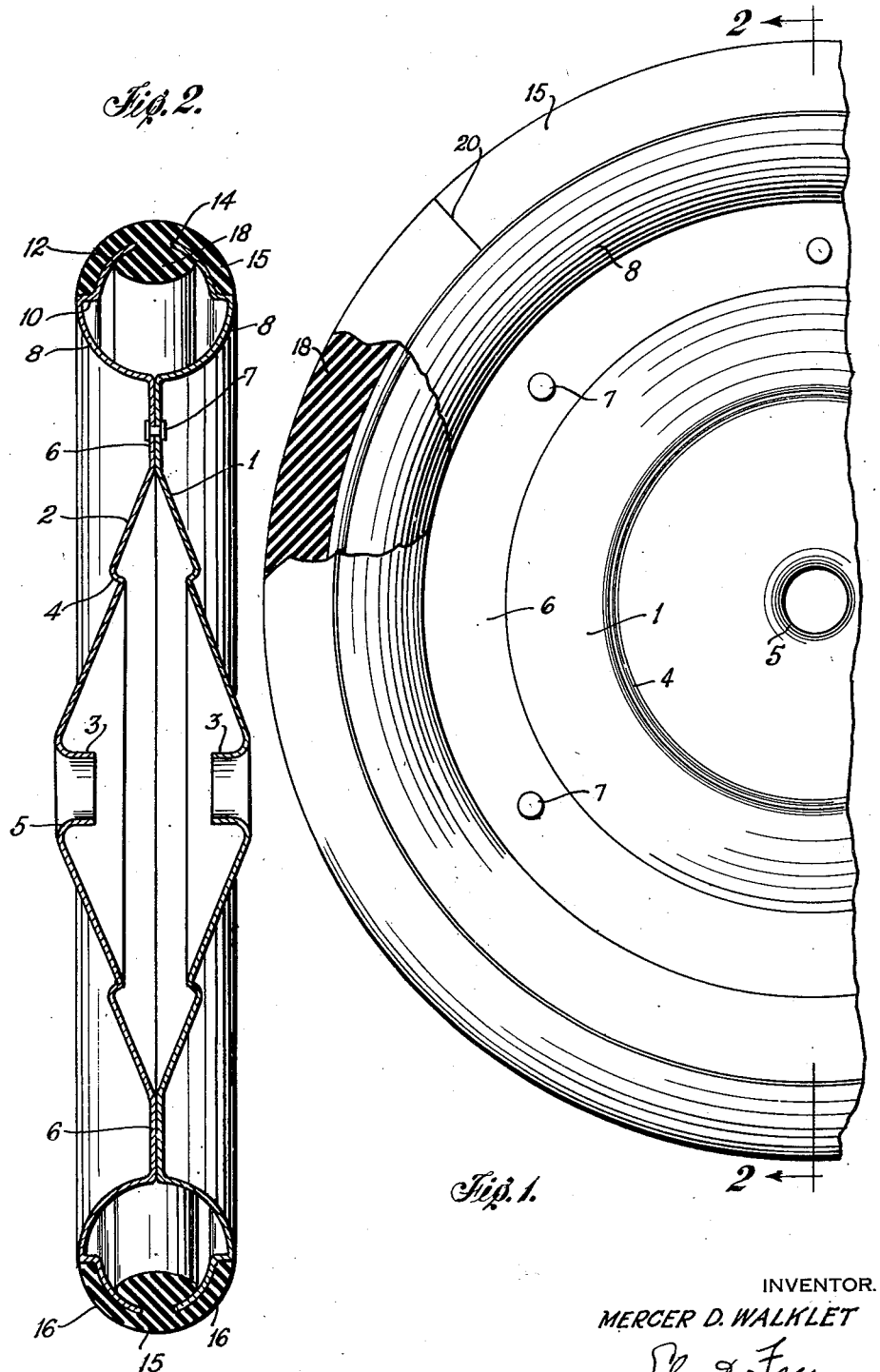
INVENTOR.
MERCER D. WALKLET
BY
ATTORNEYS.

Patented Nov. 27, 1951

2,576,270

UNITED STATES PATENT OFFICE 2,576,270

WHEEL CONSTRUCTION

Mercer D. Walklet, Akron, Ohio, assignor to The Hamlin Metal Products Company, Akron, Ohio, a corporation of Ohio Application October 25, 1947, Serial No. 782,103

3 Claims. (Cl. 152—380)

The present invention relates to new and improved construction for rubber tired metal or disk wheels which are primarily intended for use on children's toys, wagons, or the like. In the wheels for this purpose a solid rubber tire is usually cemented in a depressed channel formed on the periphery of a disk wheel. This type of wheel has certain disadvantages which it is the purpose of the present invention to overcome. One objection to the old type wheel is the expense, due to the fact that, a full round rubber tire is employed, and a second objection is the fact that in service the rubber tire frequently becomes detached from its seat on the wheel.

With the construction shown and described herein the cost of the wheel is substantially reduced because the wheel employs much less rubber without impairing the cushioning effect of the tire. While the saving in rubber in a single wheel may be small, the production of these items is very heavy and as the vehicles or toys are usually sold at relatively close margins, the improved wheel creates a substantial saving in production and assembly. The tire is permanently anchored on the wheel and cannot be removed without destroying the tire.

While the invention is intended primarily for use on children's toys, wagons, or other vehicles, the construction may also be adapted for industrial uses.

In the drawings and description the best known and preferred form of the invention is shown, but this does not mean that adherence to the details is necessary to a realization of the objects and advantages as modifications and variations may be adopted without departing from the invention.

In the drawings:

Fig. 1 is a side elevation of a wheel made in accordance with the teachings of the invention.

Fig. 2 is a section in the line 2—2 of Fig. 1.

The wheel body is comprised of two reversely positioned metal disks 1 and 2. Each disk is formed with a central opening 5 at which point the metal of the disk is pressed inwardly so that the two flanges 3 constitute the hub of the wheel. The disks are preferably made by stamping and may have ornamental ridges such as 4 pressed therein.

The web of each disk is tapered outwardly as shown to a flat radially extending area 6, and these two areas are in contact and receive the rivets 7 by which disks are held together. Instead of riveting, the two disks may be spot-welded at these points.

The periphery of each disk is formed with outwardly bulged arcuate portion 8 which in the preferred form of the invention extends for approximately 90°. From the outer edge of the channel, the metal of each disk is formed with an inwardly bent portion to form a shoulder 10 and outwardly from this shoulder the disk is formed with inwardly extending curved flanges 12 which constitute the outer periphery of the wheel body and provide a seat for the tire.

It will be noted that the flanges 12 do not meet but are spaced apart to form a peripheral slot 14 to receive the anchoring portion of the tire.

The tire, which is a vulcanized rubber band, is indicated as a whole by the numeral 15. The tire is preferably formed by extruding rubber to the desired cross section in indeterminate lengths which are vulcanized and then cut into strips of the proper length to surround a wheel. The rubber strip is of arc shape in cross section with two wings 16 which are shaped so as to fit the flanges 12 and of sufficient width so that the edges of the strip fit against the shoulders 10. To cause the wings to grip the curvature of the flanges 12, the strips of rubber may be made in a curvature of a somewhat less radius than the flanges although this refinement is not essential. If desired, the surfaces of the flanges 12 and the inner surfaces of the wings 16 may be cemented with any of the well-known rubber cements before the wheel is assembled although this is not necessary as the curvature of the tire may ordinarily be relied upon to prevent the wings 16 from flaring outwardly.

The rubber strip is formed with an internal rib or lobe 18 joined to the tread portion of the strip by a narrow neck which fits within the slot 14.

The wheel is assembled by laying two of the disks together with a strip of the rubber between the flanges 12 and then the disks are secured together by riveting or spot welding at the points 7. The construction is inexpensive to manufacture and the tire is firmly held. It is not necessary to join the ends of the rubber strip where they meet at 20. The tread portion of the strip provides for ample resilience for the purposes for which wheels of this type are intended and with much less rubber than is employed in other types of wheels of this character. The wheel has an attractive appearance and gives the impression of having a heavy rubber tire. It is preferred to form the shoulders 10 of the same depth as the tread portion of the tire so as to provide a smooth contour on the exterior of the wheel, but this is a refinement of the invention only. It is also preferred to form the lobe 18 as a continuous rib about the inside of the tire, but this lobe may be discontinuous to any desirable extent provided sufficient anchorage is afforded for the tire. It is preferred to form the body of the wheel of metal stampings but other material may be substituted if desired. The tire may be vulcanized as a circular body, thus avoiding the seam in joint 20.

What is claimed is:

1. A wheel construction comprising two opposed disks of similar contour, with flared portions defining a radially-outwardly, concave rim, inwardly extending shoulders at the outer edges of the said flared portions, inwardly directed, arc-shaped flanges beyond the shoulders, the edges of said flanges being spaced apart when the disks are assembled to provide a peripheral slot, a rubber tire about the wheel comprising a tread portion fitting over the flanges and an inwardly extending neck lying within the said slot and an enlarged lobe interiorly of the flanges, and spaced from the interior walls of said flared portions, and means to secure the disks together with the lobe of the tire held within the flanges.

2. A wheel construction comprising a wheel body formed of two opposed disks, with flared portions defining a radially-outwardly, concave rim, said disks being provided with shoulders at their outer peripheries of the said flared portions, and interiorly directed depressed flanges extending from the shoulders to the edges of the disks, said flanges being spaced apart to provide a narrow peripheral slot and a rubber tire having wings fitting over the flanges, with the edges of the wings against the shoulders, and an integral enlarged formation on the interior of the tire, said formation having a neck lying in the said slot and an enlarged lobe which bears against the inner surface of the flanges to lock the tire on the wheel, but is spaced from the inner walls of said flared portions, and means to secure the disks together.

3. A wheel construction comprising a wheel body formed of two oppositely positioned disks, with flared portions defining a radially-outwardly, concave rim, said disks being formed with inwardly directed shoulders near the outer peripheries of said flared portions, interiorly directed curved flanges extending from the shoulders to the edges of the disks, said flanges being spaced apart to provide a narrow peripheral slot about the exterior of the wheel body and a rubber tire having curved wings fitting against the exterior of said flanges and an internal rib in the tire connected thereto by a relatively narrow neck which lies in the said slot, said rib bearing against the inner surfaces of the flanges to lock the tire on the wheel, but spaced from the inner walls of said flared portions, and means to secure the disks together.

MERCER D. WALKLET.

REFERENCES CITED

The following references are of record in the file of this patent:

UNITED STATES PATENTS

| Number | Name | Date |
|---|---|---|
| Re. 17,461 | Shoemaker | Oct. 15, 1929 |
| 541,396 | Sulley et al. | June 18, 1895 |
| 954,048 | Price | Apr. 5, 1910 |
| 1,057,398 | Allison | Apr. 1, 1913 |
| 1,595,182 | Fravel | Aug. 10, 1926 |
| 2,271,432 | Hull et al. | Jan. 27, 1942 |

FOREIGN PATENTS

| Number | Country | Date |
|---|---|---|
| 15,341 | Great Britain | of 1896 |
| 419,679 | France | Nov. 2, 1910 |
| 799,461 | France | Apr. 4, 1936 |